(No Model.)

O. A. ENHOLM.
GALVANIC BATTERY.

No. 415,963. Patented Nov. 26, 1889.

WITNESSES:
Gustave Dieterich
T. F. Bourne

INVENTOR
Oscar A. Enholm.
BY
Briesen, Steele & Knauth
ATTORNEYS.

UNITED STATES PATENT OFFICE.

OSCAR A. ENHOLM, OF NEW YORK, N. Y., ASSIGNOR OF ONE-SIXTH TO IVAR H. ENHOLM, OF SAME PLACE.

GALVANIC BATTERY.

SPECIFICATION forming part of Letters Patent No. 415,963, dated November 26, 1889.

Application filed April 19, 1889. Serial No. 307,702. (No model.)

*To all whom it may concern:*

Be it known that I, OSCAR A. ENHOLM, a resident of the city, county, and State of New York, have invented an Improved Electric Battery, of which the following is a specification.

The object of my invention is to simplify the construction of electrical batteries and to render them very durable, while requiring comparatively little attention.

The invention consists in the combination of a battery-jar for holding chemical solutions with a dense partition or wall within it for separating two solutions, said partition or wall acting to prevent the passage of one solution into the other, while serving as a conductor between the solutions.

The invention further consists in the details of improvement and the combinations of parts, that will be more fully hereinafter set forth.

Reference is to be had to the accompanying drawings, forming part of this specification, wherein—

Figure 1:
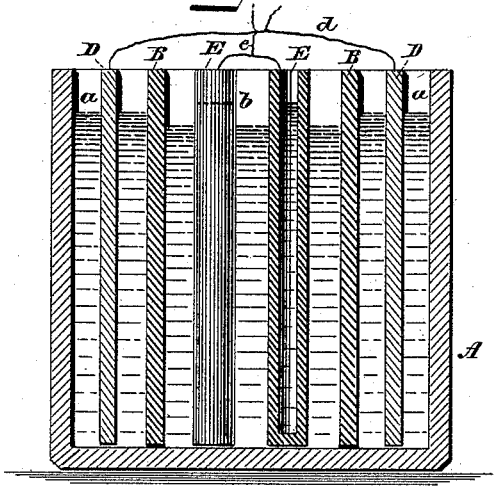
Figure 2:
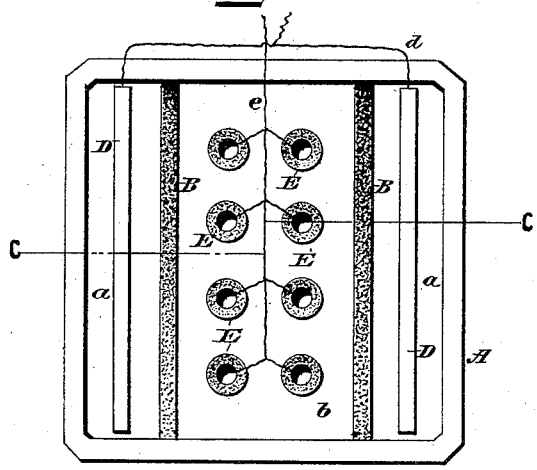
Figure 3:
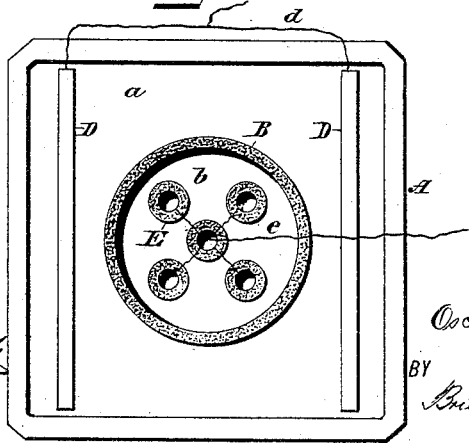

Figure 1 is a vertical cross-section, on the plane of the line $c\ c$, Fig. 2, of an electrical battery constructed according to my invention. Fig. 2 is a plan view of the same, and Fig. 3 is a plan view of a modification.

Referring now to the drawings, the letter A represents a jar or receptacle, which may be of any suitable size, shape, and material, and adapted to hold chemical solutions. Within the jar or receptacle A are two dense partitions B B, extending from wall to wall of the jar and along the bottom of the same, so as to form water-tight compartments $a\ a$ and $b$. (See Figs. 1 and 2.) In the compartment $a$, I place a weak chemical solution of, say, sulphuric acid and water, and in the compartment $b$, I place a similar but stronger solution; but it is evident that the positions of the weak and strong solutions could be reversed—that is to say, the strong solution could be in $a$ and the weak solution in $b$, while any other desired kind of chemical solution could be used.

The wall or partition B, I prefer to make of dense carbon, which will prevent the weak solution from one compartment $a$ or $b$ percolating through the partition B and mixing with the strong solution in the adjacent compartment, and vice versa; but this dense-carbon partition, while separating the weak from the strong solution and preventing their mixing, acts as a conductor between the two solutions, whereby the internal action of the battery is increased and the partition is not injured by the action of the chemicals in the battery.

D are the zinc or negative electrodes of the battery which I place in the weak solution, being shown in the drawings in the compartment $a$.

In Figs. 1 and 2 of the drawings I have shown two compartments $a$ and two electrodes D, said electrodes being coupled together by a wire $d$.

In the compartment $b$, or in the strong solution, I place one or more carbon electrodes E, that form the positive pole of the battery. When more than one of these electrodes E are used, they are all put into connection with a single wire $e$, that connects with the main conductor in the usual manner.

The electrodes E are made in the form of porous carbon cups and contain strong acid, which gradually percolates through the cup, and thereby replenishes the strong solution as it is weakened by the action of the battery. From the above it will be seen that the cups E serve the double purpose of the positive pole of the battery and of a retainer of acid to replenish the strong solution.

By placing the zinc or negative electrodes D in a weak solution and separating said solution from the strong solution, so that the two solutions cannot mix, the zinc will not be eaten by the acid as fast as if the strong solution could reach the weak solution to increase its strength, and therefore the polarization of the negative pole will be comparatively slow.

Although in Figs. 1 and 2 two partitions B and two compartments $a$ are shown, it is evident that one partition B and one compartment $a$ would answer in many cases. In Fig. 3 I have shown a battery having one compartment $a$ and one partition B. In this case the partition B is circular and is situated at about the center of the jar A, the space between the outer walls of the partition B and the inner walls of the jar A forming the compartment $a$, while the space inclosed by the partition B constitutes the compartment $b$.

Having now described my invention, what I claim is—

1. In a battery, the jar or receptacle A, combined with a dense partition which is impermeable to the solution on either side of it, but which is an electric conductor between the solutions, substantially as described.

2. In a battery, the jar or receptacle A, combined with a dense-carbon partition impermeable to the solutions on either side of it, but which is an electric conductor between the solutions, and with the positive electrode in one compartment and the negative electrode in the other compartment, substantially as described.

3. In a battery, the jar A, having the dense and impermeable carbon partition B, combined with the porous carbon cup E, substantially as described.

OSCAR A. ENHOLM.

Witnesses:
T. F. BOURNE,
HARRY M. TURK.